United States Patent [19]
Furuhashi et al.

[11] Patent Number: 4,929,806
[45] Date of Patent: May 29, 1990

[54] HEADLIGHT DIMMER SWITCH DEVICE

[75] Inventors: Kenshi Furuhashi; Hiroyuki Sawada, both of Aichi, Japan

[73] Assignee: Kabushiki Kaisha Tokai Rika Denki Seisakusho, Aichi, Japan

[21] Appl. No.: 321,129

[22] Filed: Mar. 9, 1989

[30] Foreign Application Priority Data

Mar. 18, 1988 [JP] Japan .............................. 63-36664[U]

[51] Int. Cl.⁵ ...................... H01H 9/00; H01H 13/62; H01H 19/00
[52] U.S. Cl. .............................. 200/61.54; 200/61.27; 200/525
[58] Field of Search ............ 200/5 R, 4, 61.54, 61.27, 200/61.3, 61.34, 61.35, 524, 525

[56] References Cited
U.S. PATENT DOCUMENTS 3,254,168  5/1966  Peterson .......................... 200/61.27
3,619,528  11/1971  Sorenson ............................. 200/525

Primary Examiner—J. R. Scott
Attorney, Agent, or Firm—Finnegan, Henderson, Farabow, Garrett and Dunner

[57] ABSTRACT

The switch device of the present invention includes an actuator member operated by linear movement in a first direction. An angularly movable member angularly moves in response to the linear movement of the actuator member. The direction of angular movement of the angularly movable member is reversed each time the actuator member is moved an additional distance. A first switch is switched between one state and the other each time the direction of angular movement of the angularly movable member is reversed. A cam member is angularly movable in response to the linear movement of the actuator member in the first direction. The cam members includes an operation portion for moving one of two opposed contacts of a second switch relative to the other to turn on the second switch. When the cam member is angularly moved, the operating portion is movable a distance smaller than a distance of linear movement of the actuator member.

4 Claims, 5 Drawing Sheets

HEADLIGHT DIMMER SWITCH DEVICE

FIELD OF THE INVENTION

This invention relates to a switch device for simultaneously switching a plurality of switches by operation of a single actuator member.

BACKGROUND OF THE INVENTION

Conventional switch devices having a momentary type switch used as a dimmer switch for switching a headlamp or headlight between a high beam and a low beam condition use a separate contact opposed type switch. To prevent both the high beam and low beam from being turned off at the same time, the separate contact opposed type switch is activated when the momentary type switch is switched between the high beam and low beam conditions. This is the conventional attempt to avoid phenomenon commonly referred to as dark zone. The contact opposed type switch is designed to have a movable contact in the form of a leaf spring that is pushed by a push rod into contact with a fixed contact member to turn on the switch prior to the switching of the momentary type switch.

After the contact opposed type switch is turned on, the push rod is further moved in the same direction by the distance or stroke required for switching the momentary type switch. That is, after the contact opposed type switch is turned on, the push rod is designed to be further moved by a predetermined amount or stroke to flex the movable contact. The conventional leaf springs used for movable contacts have been made long in length to avoid excessive stress caused by flexing. However, use of a long leaf spring renders it difficult to manufacture a smaller or compact version of the contact opposed type switch.

In an effort to achieve a compact contact opposed type switch, it has been proposed to replace such a leaf spring with others mechanisms. A further proposal has been a leaf spring serving as a movable contact of a contact opposed type switch that is pulled by a rod away from a mating fixed contact to maintain the OFF state. In this proposed structure, when the momentary type switch is operated, the contact opposed type switch is turned on as a result of the restoring force of the leaf spring. Problems with the conventional contact opposed type switches are that for assembly purposes they must be provided as a unit and are not compact in size. As a result, the conventional contact opposed type switches can not be used with all types of light control switches.

SUMMARY OF THE INVENTION

An object of the present invention is to overcome the problems and disadvantages of the prior art.

An object of the present invention is a switch device operable in conjunction with all types of light control switches without the use of an associated contact opposed type switch unit.

A further object of the present invention is a switch device that may be manufactured compact in size.

Additional objects and advantages of the present invention are set forth in the following description, or may be learned by practice of the invention. The objects and advantages of the present invention will be realized and attained by means of the elements and combinations particularly pointed out in the appended claims.

To achieve the objects and in accordance with the purpose of the present invention, as embodied and broadly described herein, the present invention comprises an actuator member having means for moving linearly in increments in a first direction. An angularly movable member is provided to be pivotably movable in second and third directions in response to the incremental movement of the actuator member. The direction of angular movement of the angularly movable member alternates between the second and third directions when said actuator member is moved in the first direction. A first switch is provided of the momentary type having a first movable contact and a pair of first fixed contacts. Means is provided for alternately pivoting the movable contact into contact with the pair of fixed contacts to effect a switching operation in response to said angularly movable member changing from the second to the third directions and the third to the second directions. A second switch having a second movable contact and a second fixed contact disposed in opposed relation to the second movable contact is provided. A cam member having an operation portion engaged with the second movable contact is provided. Means is provided for angularly moving the cam member in response to the movement of the actuator member to cause the operating portion to place the second movable contact in contact with the second fixed contact. The operating portion is movable a first distance which is smaller than the distance traveled by the angularly movable member upon moving incrementably.

BRIEF DESCRIPTION OF THE DRAWINGS

The accompanying drawings, which are incorporated in and constitute a part of this specification, illustrate several embodiments of the present invention and together with the description, serve to explain the principles of the present invention.

DESCRIPTION OF THE PREFERRED EMBODIMENT

Figure 1:
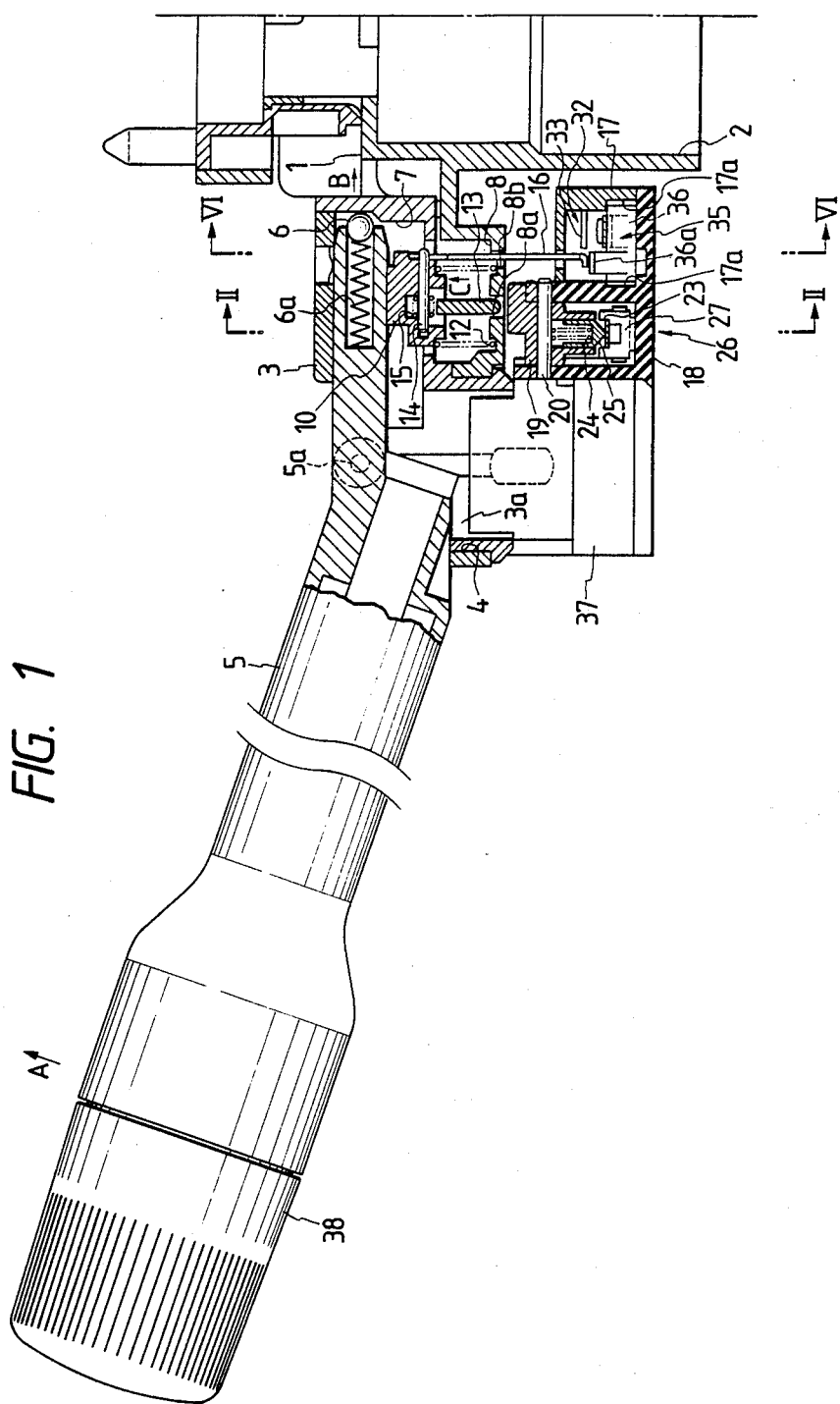
FIG. 1 is a cross sectional view of the switch device of the present invention.

As shown in FIG. 1, the switch device of the present invention includes a frame 1 for a lever operated combination switch. A bore portion 2 is located at the central portion of the frame 1 for receiving a steering shaft (not shown). A turn bracket 3 having a tubular portion 3a is attached to the lever 5. The tubular portion 3a of the turn bracket is movably fitted at an angle on a hole 4 located in the frame 1. The lever 5 has a pivotal portion 5a movably supported by the turn bracket 3 at an angle with respect to turn bracket 3 such that the lever 5 can be angularly moved in the direction of the arrow A. The lever 5 has a distal end on which a ball 6 is carried. The ball 6 is urged by a coil spring 6a in the direction of the arrow B. In this way, the ball 6 is biased against a stepped portion 7 of the frame 1.

As shown in FIGS. 2-5, the frame 1 forms a rectangular recess 8 disposed adjacent to the distal end portion of the lever 5. A pair of guide portions 9 having a rectangular cross section extend perpendicularly upward from the bottom of the recess 8. A pair of opposed engaging pawls 9b are located at the distal end of each guide portion 9 and are separated to define a slot 9c. Each of the engaging pawls 9b has an outer inclined surface 9a. The central slot 9c allows the pair of engaging pawls 9b to resiliently move toward one another.

An actuator member 10 is disposed in the recess 8. The actuator 10 is retained at the distal end of the lever 5. The actuator member 10 has a pair of guide holes 11. The guide portions 9 are slidably located in the guide holes. Consequently, the actuator member 10 is guided by the guide portions 9 upon movement of the actuator member 10 relative to the recess 8. When the actuator member 10 is moved to its outermost position in the direction of an arrow C, the engaging pawls 9b of the guide portions 9 are engaged with shoulders 11a that are formed on the upper portion of each guide hole 11. In this way, the actuator member 10 cannot separate from the guide portions 9. A compression coil spring 12 extends between the bottom of the recess 8 and the actuator member 10 and urges the actuator member 10 in the direction of the arrow C.

An operating pin 13 is mounted adjacent to the inner surface of the actuator member 10. Mounting of the operating pin 13 is achieved by pin 14 having a torsion coil spring 15 wound therearound and engaging one end of the end of the pin 14 so that the operating pin 13 may be angularly moved. Normally, the torsion spring 15 holds the operating pin 13 in a neutral position. In the neutral position, the distal end of the operating pin 13 is received in a slot-like aperture 8a located in the bottom wall of the recess 8. As shown in FIG. 1, an operating rod 16 is fixedly mounted on the end of the actuator member 10 by pin 14. The operating rod 16 extends downwardly through an aperture 8b formed in the bottom wall of the recess 8.

A switch casing 17 is fixedly secured to the lower surface of the frame 1 by screws or the like. The switch casing 17 is disposed beneath the recess 8. An insulator 18 is attached to the bottom of the switch casing 17. An angularly movable member 19 is mounted in the switch casing 17 about a pin 20. The angularly movable member 19 has bottom and top surfaces facing towards the insulator 18 and away from the insulator 18, respectively. A pair of V-shaped engaging grooves 21 and 22 are formed in the top surface of the angularly movable member 19. The V-shaped engaging grooves 21 and 22 are disposed generally facing the distal end of the operating pin 13. A hole 23 is formed in the bottom surface of the angularly movable member 19. An operating piece 25 and a compression coil spring 24 are located in the hole 23. The compression coil spring 24 is positioned in the hole 23 to bias the operating piece 25 into the hole 23.

A first switch of the momentary type is generally designated by reference numeral 26. The first switch 26 operates in response to the angular movement of the angularly movable member 19. The first switch 26 includes a pair of stationary contacts 28 and 29. The stationary contacts 28 and 29 are mounted at a central portion of the insulator 18. A movable contact 30 is provided and is centrally supported in a seesaw manner on contact support member 27 by a coil spring 31. As a result, the movable contact 30 is angularly movable in opposite directions. The contact support member 27 is mounted on the insulator 18 and disposed intermediate the fixed contacts 28 and 29. The distal end of the operating piece 25 presses against the movable contact 30.

Figure 6:
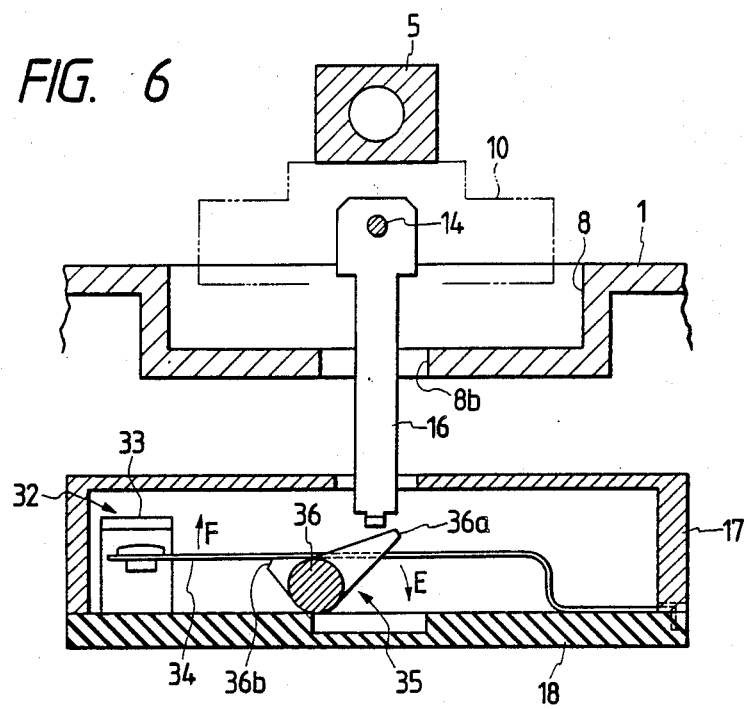
FIGS. 6 to 8 are cross sectional views taken along the lines VI—VI of FIG. 1 of the operation of the second switch of the switch device of present invention.
Figure 7:
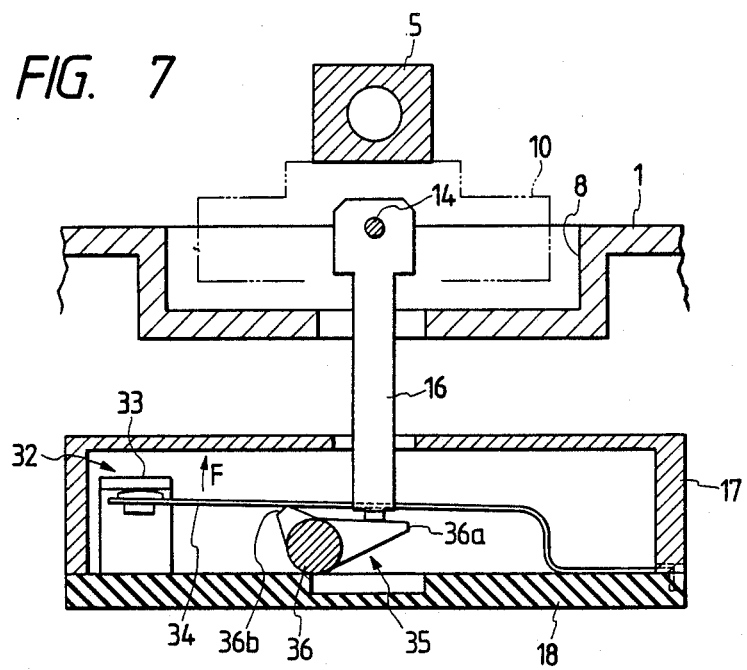
Figure 8:
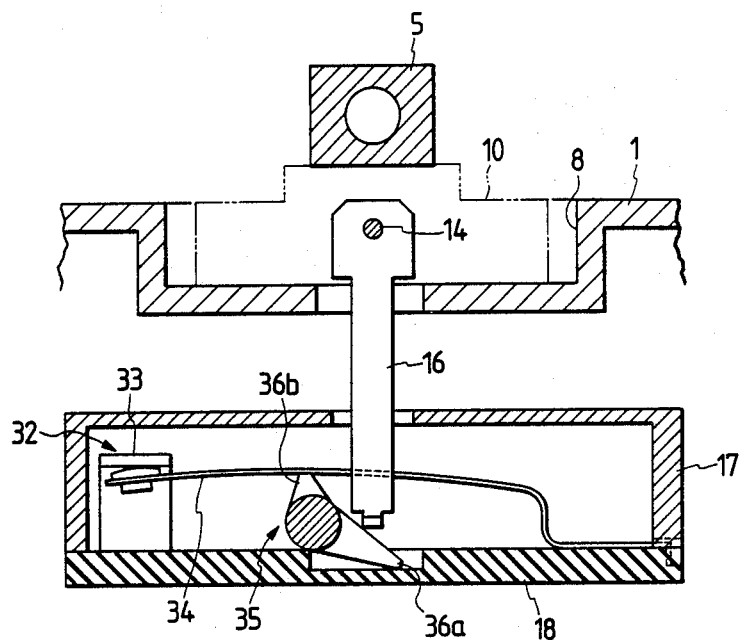

As shown in FIGS. 6-8, a second switch of the contact opposed type is mounted on the insulator 18 and is generally designated by reference numeral 32. The second switch 32 includes a fixed contact 33 and a movable contact 34. The fixed contact 33 is formed by bending a metal plate into a predetermined shape. The movable contact 34 is in the form of a leaf spring. The movable contact 34 is fixedly secured at one end to the insulator 18. The movable contact 34 is normally positioned away from the fixed contact 33 due to its own resilient force.

As shown in FIGS. 6 and 7, a cam member 35 having a shaft portion 36 and a pair of first and second arms 36a and 36b is provided to interact with the movable contact 34. The first and second arms 36a and 36b are integrally formed with the shaft 36 and extend from the shaft portion 36 in generally opposite directions. The axis of the shaft portion 36 lies parallel to the plane of the insulator 18. The opposite ends of the shaft portion 36 are received in a pair of recesses 17a. The recesses 17a are formed in the switch casing 17 so that the cam member 35 can be angularly moved about the axis of the shaft portion 36. The distal end of the operating rod 16 can engage the first arm 36a of the cam member 35. The second arm 36b functions as the operating portion of the cam member 35. That is, the second arm 36b is held in engagement with a central portion of the movable contact 34. The second arm 36b is shorter than the first arm 36a. Preferably, the second arm 36b is, for example, one third of the length of the first arm 36a.

The first switch 26 serves as a dimmer switch for switching a headlamp or headlight of a vehicle from high beam to low beam. The second switch 32 functions as a passing switch. As shown in FIG. 1, a light control switch 37 is mounted on the lower surface of the frame 1 adjacent to the switch casing 17. The functioning of the light control switch 37 can be altered by angularly moving a knob 38 located on the proximal end of the lever 5.

Figure 2:
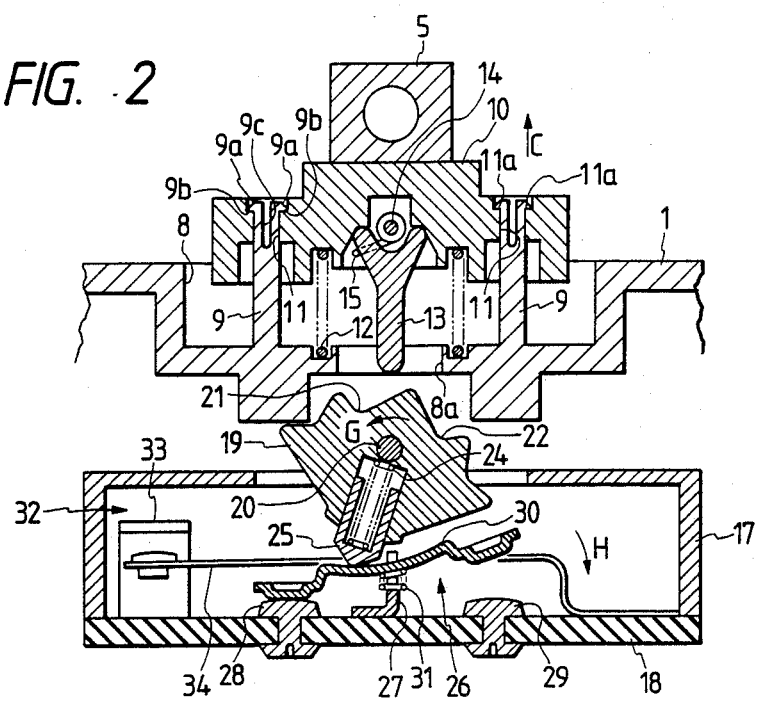
FIGS. 2 to 5 are cross sectional views taken along line II—II of FIG. 1 of the sequential operation of the first switch of the switch device of the present invention.

The operation of the switch device of the above construction will now be described. As shown in FIG. 2, the movable contact 30 of the first switch 26 is held in contact with the fixed contact 28. At this stage, if the lever 5 is angularly moved in the direction of arrow A the actuator member 10 is urged downwardly against the bias of the compression coil spring 12 opposite to the direction of arrow C. As a result, the lower end of the operating pin 13 is placed in sliding contact with a side wall of the engaging groove 21 of the angularly movable member 19. Consequently, the operating pin 13 is angularly moved in the direction of arrow D.

Figure 3:
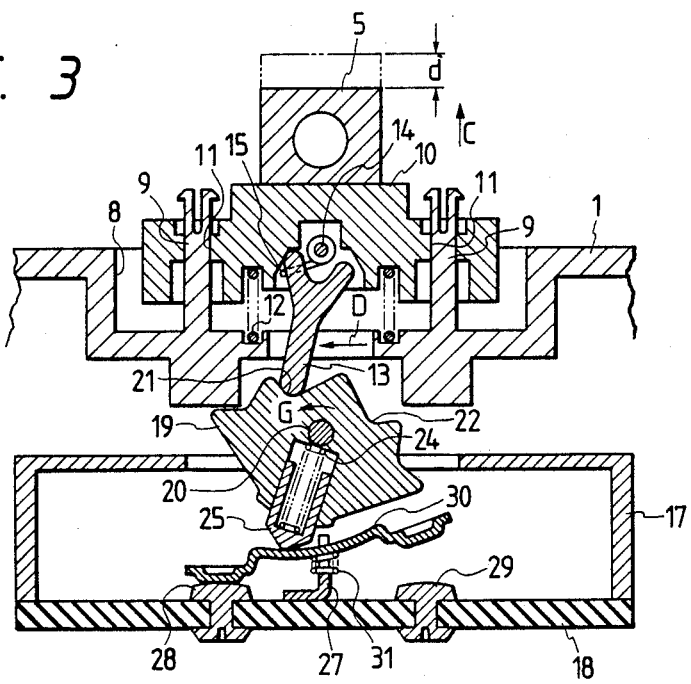

As shown in FIG. 3, when the actuator member 10 is forced downwardly a predetermined stroke or distance d, the lower end of the operating pin 13 engages the bottom of the engaging groove 21. Alternatively, as previously explained, when the actuator member 10 is forced downwardly in the direction opposite of arrow C, the operating rod 16 is moved also in conjunction with the actuator member 10. Thus, the operating rod 16 and the actuator 10 move in the same direction. As a result as shown in FIG. 6, the cam member 35 is angularly moved in a clockwise direction in the direction of an arrow E in FIG. 6 about the shaft portion 36. This is caused by the lower end of the operating rod 16 engaging the first arm 36a. Consequently, the second arm 36a or operating portion is angularly moved in the direction of the arrow E and biases the movable contact 34 of the second switch 32 in the direction of an arrow F. As shown in FIG. 7, the movable contact 34 thus comes into contact with the fixed contact 33 and the second switch 32 is made operational, i.e., it is turned on.

If the actuator member 10 is moved further downward past stroke d, the operating pin 13 moves the angularly movable member 19 in the direction of arrow G. This is caused by the coil spring 31. Because of the angular movement, the operating piece 25 is slidingly moved over the movable contact 30 beyond the contact support member 27 and toward the fixed contact 29. That is, the movable contact 30 is angularly moved in a direction of arrow H. Consequently, the movable contact 30 is moved out of contact with the fixed contact 28 and is instead brought into contact with the fixed contact 29 thereby switching the first switch 26 from one state to the other.

Figure 4:
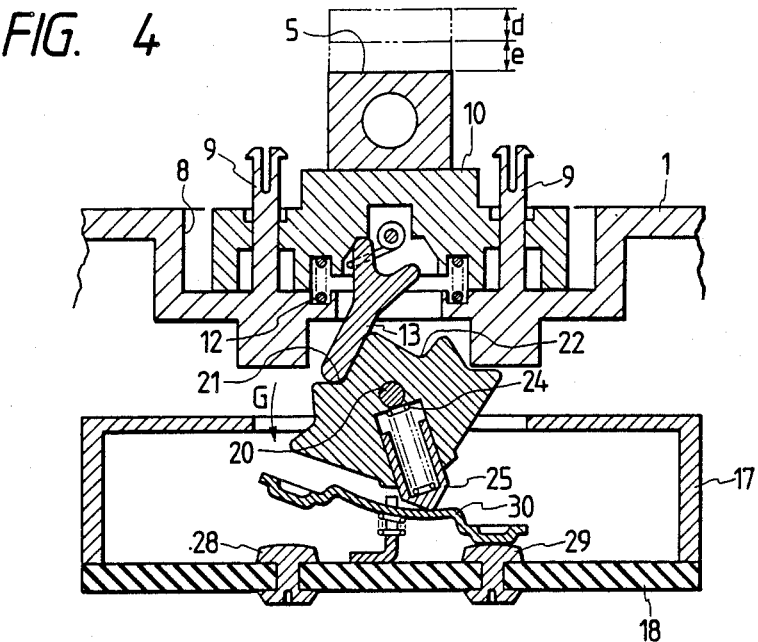
Figure 5:
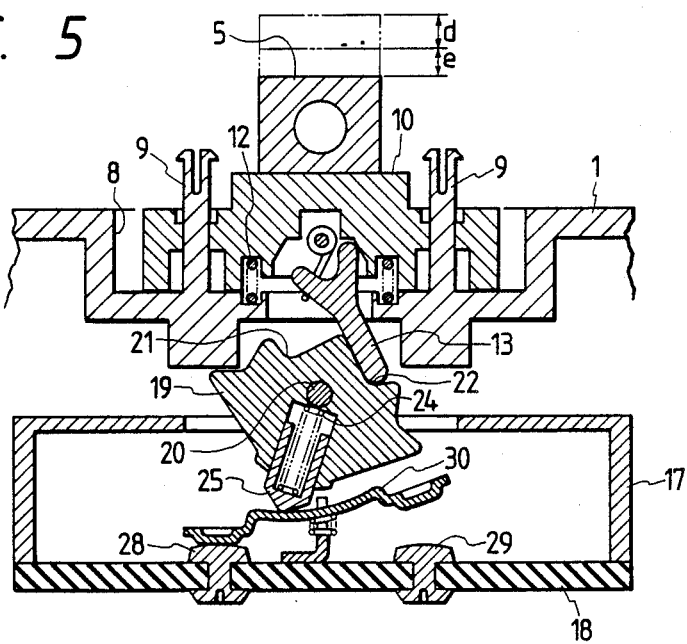

As shown in FIGS. 4 and 8, when the actuator member 10 is moved a stroke or distance e from the end of the stroke or distance d in the direction opposite to the direction of arrow C as described above, the operating rod 16 also is moved in the same direction. The cam member 35 is angularly moved in the direction of the arrow E. However, since the length of the second arm 36b is one third of the length of the first arm 36a, the central portion of the movable contact 34 of the second switch 32 is only moved or displaced by an amount of one third of the stroke e. As a result, as shown in FIG. 8, the movable contact 34 is made to flex or bend.

After the switching operation of the first switch 26 as described above is completed and the force applied to the lever 5 to move the same in the direction of the arrow A is released, the lever 5 can be angularly moved in the direction opposite to the arrow A and is returned to its initial position. This is effected by the interaction of the coil spring 6a, the ball 6 and the stepped portion 7. As a result, the actuator member 10 and the operating rod 16 are returned to their respective initial positions.

FIG. 1 shows the initial state wherein the switch is under the influence of the compression coil spring 12. At this point, the operating pin 13 disengages from the engaging groove 21, returns to its neutral position subject to the influence of the torsion coil spring 15, and is disposed opposite to the engaging groove 22. As shown in FIG. 6, because the operating rod 16 is returned to its initial position, the movable contact 34 returns to its initial position. That is, the movable contact 34 is subjected to its own restoring force opposite to the direction of arrow F. The movable contact 34 is disengaged from the fixed contact 33 and the second switch 32 is turned off. Consequently, the cam member 35 is angularly moved to its initial position or in the opposite direction of arrow E.

Subsequently, if the lever 5 is again angularly moved in the direction of the arrow A the actuator member 10 is moved downwardly from the initial position shown in FIG. 1. The operating pin 13 is brought into sliding contact at its lower end with one side wall of the engaging groove 22 of the angularly movable member 19. The operating pin 13 is angularly moved in the direction opposite to arrow D. When the actuator member 10 is moved downwardly a predetermined distance or stroke d, the lower end of the operating pin 13 engages the bottom of the engaging groove 22. At this point, the first arm 36a is pushed by the lower end of the operating rod 16 previously described. Consequently, the cam member 35 is angularly moved in the direction of the arrow E so that the movable contact 34 is put in contact with the fixed contact 33 thereby turning on the second switch 32.

Thereafter, if the actuator member 10 is moved further downwardly by the stroke e from the end of the distance or stroke d, the angularly movable member 19 is angularly moved by the operating pin 13 in the direction opposite to arrow G. In accordance with this angular movement, the operating piece 25 slidingly moves over the movable contact 30 and past the contact support member 27 toward the fixed contact 28. The movable contact 30 is angularly moved in the direction opposite to arrow H. The movable contact 30 is moved out of contact with the fixed contact 29, and instead the movable contact 30 contacts the fixed contact 28. Thus, the first switch is switched to the initial condition.

When the actuator member 10 is further moved downwardly the distance or stroke e as described above, the movable contact 34 of the second switch 32 is displaced by one third of the distance in the direction of arrow F. Consequently, as shown in FIG. 8 the movable contact 34 flexes.

The fixed contact 28 of the first switch 26 is connected to a filament for the high beam of the headlamp. The fixed contact 29 is connected to a filament for the low beam of the headlamp. The movable contact 30 of the first switch 26 is connected to a battery via the light control switch 37. The second switch 32 is connected between the filament for high beam of the headlamp and the battery.

When the actuator member 10 is moved downwardly by the distance or stroke d as a result of angular movement of the lever 5 in the direction of the arrow A, the filament for high beam of the headlamp is lit to effect a passing light. When the lever 5 is angularly moved in the direction of arrow A, the actuator member 10 is further moved by the distance or stroke e and the dimmer operation of the headlamp is effected.

When the first switch 26 is switched between one state and the other, its movable contact 30 is not in contact with either of the fixed contacts 28 and 29 for a certain period of time. However, during this switching operation of the first switch 26, the filament for high beam is lit through the second switch 32. Therefore, the structure of the present invention prevents both of the high beam and low beam filaments from being de-energized at the same time. This prevents the occurrence of the a so-called dark zone.

As previously described, after the second switch 32 is turned on, the operating rod 16 is further moved by the distance or stroke e. Since the second arm 36b of the cam member 35 is moved by a distance or stroke smaller than the above stroke e of the operating rod 16, the amount of flexing of the movable contact 34 of the second switch 32 caused by the cam member 35 is smaller than has heretofore being available. Because the present invention employs a movable contact 34 in the form of a leaf spring the movable contact can be smaller in length than is conventional. This reduces the size of the second switch 32 and hence the overall size of the switch device. Further, the second switch 32 of the contact opposed type is of the general type having the leaf spring serving as the movable contact 34. Therefore, the second switch 32 does not need to be formed as a unit, as is the case with the conventional switch device. Consequently, the switch device of the present invention can be employed with all types of light control switches.

Other embodiments of the present invention will be apparent to those skilled in the art from consideration of the specification and practice of the disclosed invention. It is intended that the specification and examples be considered as exemplary only, with the true scope and spirit of the invention being represented by the following claims.

What is claimed is:

1. A switch device comprising:
   (a) an actuator member having means for moving linearly in a first direction;
   (b) an angularly movable member pivotably movable in second and third directions in response to the movement of said actuator member, the direction of angular movement of said angularly movable member alternating between said second and third directions when said actuator member is moved in said first direction;
   (c) a first switch of the momentary type having a first movable contact and a pair of first fixed contacts, means for alternately pivoting said movable contact into contact with said pair of fixed contacts to effect a switching operation in response to said angularly movable member changing from said second to third directions and said third to second directions;
   (d) a second switch having a second movable contact and a second fixed contact disposed in opposed relation to said second movable contact; and
   (e) a cam member having an operation portion engaged with said second movable contact, means for angularly moving said cam member in response to the movement of said actuator member to cause said operation portion to place said second movable contact in contact with said second fixed contact before said first switch is switched, said operation portion being movable a first distance, said first distance being smaller than the distance traveled by said actuator member.

2. A switch device comprising:
   (a) an actuator member having means for moving linearly in a first direction;
   (b) an angularly movable member pivotably movable in second and third directions in response to the movement of said actuator member, the direction of angular movement of said angularly movable member alternating between said second and third directions when said actuator member is moved in said first direction;
   (c) a first switch of the momentary type having a first movable contact and a pair of first fixed contacts, means for alternately pivoting said movable contact into contact with said pair of fixed contacts to effect a switching operation in response to said angularly movable member changing from said second to third directions and said third to second directions;
   (d) a second switch having a second movable contact and a second fixed contact disposed in opposed relation to said second movable contact; and
   (e) a cam member having an operation portion engaged with said second movable contact, means for angularly moving said cam member in response to the movement of said actuator member to cause said operation portion to place said second movable contact in contact with said second fixed contact, said operation portion being movable a first distance, said first distance being smaller than the distance traveled by said actuator member upon moving a further distance;
   wherein said second movable contact is in the form of a leaf spring disposed in opposed relation to said second fixed contact, and said operation portion of said cam member being engaged with said leaf spring intermediate the opposite ends of said leaf spring.

3. The switch device according to claim 2, wherein said operating portion of said cam member biases said other end of said leaf spring into contact with said second fixed contact in response to an initial movement of said actuator member through the angular movement of said cam member, said operation portion urges the longitudinal flexing of said leaf spring when said operation portion is moved by a further movement of said actuator member.

4. A switch device comprising:
   (a) an actuator member having means for moving linearly in a first direction;
   (b) an angularly movable member pivotably movable in second and third directions in response to the movement of said actuator member, the direction of angular movement of said angularly movable member alternating between said second and third directions when said actuator member is moved in said first direction;
   (c) a first switch of the momentary type having a first movable contact and a pair of first fixed contacts, means for alternately pivoting said movable contact into contact with said pair of fixed contacts to effect a switching operation in response to said angularly movable member changing from said second to third directions and said third to second directions;
   (d) a second switch having a second movable contact and a second fixed contact disposed in opposed relation to said second movable contact;
   (e) a cam member having an operation portion engaged with said second movable contact, means for angularly moving said cam member in response to the movement of said actuator member to cause said operation portion to place said second movable contact in contact with said second fixed contact, said operation portion being movable a first distance, said first distance being smaller than the distance traveled by said actuator member upon moving a further distance; and
   (f) an operating rod operatively connected at one end to said actuator member for linear movement therewith, said cam member having a shaft portion and a pair of first and second arms extending from said shaft portion in generally opposite directions, said cam member being angularly movable about the axis of said shaft portion, said first arm being greater in length than said second arm, the other end of said operating rod being engageable with said first arm to angularly move said cam member about the axis of said shaft portion, and said second arm serving as said operation portion of said cam member.

* * * * *